US007118155B2

(12) United States Patent
Miyake et al.

(10) Patent No.: US 7,118,155 B2
(45) Date of Patent: Oct. 10, 2006

(54) AUTOMATIC OPENING AND CLOSING DEVICE

(75) Inventors: Yoshinori Miyake, Haga-gun (JP); Tomofumi Ichinose, Shioya-gun (JP); Kenichi Munenaga, Utsunomiya (JP); Junichi Busujima, Kiryu (JP); Takao Ochiai, Kiryu (JP); Tatsuya Kaneko, Kiryu (JP); Kazunori Ishihara, Kiryu (JP)

(73) Assignees: Honda Motor Co., Ltd., Tokyo (JP); Mitsuba Corporation, Kiryu (JP)

( * ) Notice: Subject to any disclaimer, the term of this patent is extended or adjusted under 35 U.S.C. 154(b) by 0 days.

(21) Appl. No.: 11/237,155

(22) Filed: Sep. 28, 2005

(65) Prior Publication Data

US 2006/0071503 A1 Apr. 6, 2006

(30) Foreign Application Priority Data

Oct. 1, 2004 (JP) ............................ 2004-290211

(51) Int. Cl.
*B62D 25/10* (2006.01)

(52) U.S. Cl. ................ 296/76; 296/146.4; 296/146.11; 49/340

(58) Field of Classification Search .................. 296/76, 296/146.4, 146.11; 292/DIG. 3; 49/339, 49/341, 340
See application file for complete search history.

(56) References Cited

U.S. PATENT DOCUMENTS

| | | | | |
|---|---|---|---|---|
| 6,283,530 | B1 * | 9/2001 | Hollerbach | 296/76 |
| 6,419,293 | B1 * | 7/2002 | Nicholas et al. | 296/76 |
| 6,575,517 | B1 * | 6/2003 | Yamagishi et al. | 296/76 |
| 6,601,903 | B1 * | 8/2003 | Nakagome | 296/76 |
| 2006/0071504 | A1 * | 4/2006 | Ishihara et al. | 296/146.4 |

FOREIGN PATENT DOCUMENTS

| | | |
|---|---|---|
| JP | 2001-012145 | 1/2001 |

* cited by examiner

*Primary Examiner*—Jason Morrow
(74) *Attorney, Agent, or Firm*—Rankin, Hill, Porter & Clark LLP

(57) ABSTRACT

An automatic opening and closing device including: a trunk lid; a drive unit which generates drive force for operating the opening and closing member; a hinge arm which is mounted between a rear fender and wheel house inner panel and the trunk lid; and a first link and a second link which transmit the drive force of the drive unit to the trunk lid. The drive unit is fitted to an edge portion of a trunk room aperture portion, and the first and second link are provided so as to straddle the hinge arm.

4 Claims, 8 Drawing Sheets

AUTOMATIC OPENING AND CLOSING DEVICE

BACKGROUND OF THE INVENTION

1. Field of the Invention

The present invention relates to an automatic opening and closing device for automatically operating an opening and closing member like a trunk lid of a vehicle or the like.

Priority is claimed on Japanese Patent Application No. 2004-290211, filed Oct. 1, 2004, the content of which is incorporated herein by reference.

2. Description of Related Art

In the field of trunk lids of vehicles, there are known types in which the trunk lid is automatically opened and closed via a drive device. For example, there is a type in which, along with the main portion of an actuator, which is a drive device, being supported upon the vehicle body, the end of the actuator is supported upon a hinge member of the trunk lid, which is supported upon the vehicle body so as to be able to be opened and closed, with the trunk lid being opened and closed, via the hinge, by the actuator elongating and shortening (refer to Japanese Unexamined Patent Application, First Publication No. 2001-12145).

However, with the above described prior art type automatic opening and closing device, there is the problem in that a certain amount of drive force is required for varying the position of the actuator itself because when the trunk lid is being automatically opened and closed, the actuator varies its attitude along with this opening and closing operation for the trunk lid.

Furthermore, since the actuator moves along with a movable portion such as the hinge or the like and changes its attitude, there may be a loss of operational reliability of the actuator, if there is a possibility in that this change of attitude may exert an influence upon the operation of the actuator.

SUMMARY OF THE INVENTION

Thus, an object of the present invention is to provide an automatic opening and closing device which can enhance the operating reliability with a low drive force.

In order to achieve the above described object, an automatic opening and closing device including: an opening and closing member; a drive device which generates drive force for operating the opening and closing member; a hinge arm which is mounted between a vehicle body and the opening and closing member; and a link device which transmits the drive force of the drive device to the opening and closing member; wherein the drive device is fitted to an edge portion of an aperture portion for the opening and closing member which is formed in the vehicle body; and wherein the link device is provided so as to straddle the hinge arm.

By employing this structure, it is possible to stabilize the operation of the drive device which is attached to the vehicle body. It is possible to make the drive device more compact, since the drive device is not required changing the attitude thereof so that a drive force is smaller than in the case in which the drive device changes attitude thereof during the opening and closing operation of the opening and closing member. Since the drive device is provided upon the edge portion of the aperture portion, and the link device is provided so as to straddle the hinge arm, accordingly it is possible to keep the aperture portion for the opening and closing member as large as possible.

According to the present invention, the beneficial effect is obtained that it is possible to enhance the reliability of operation of the opening and closing member. Furthermore, the beneficial effect is obtained that it is possible to make a contribution to enhancement of fuel economy, since it is the vehicle body may be made lighter. Moreover, there is also the beneficial effect that it is possible to increase the load carrying capacity.

It is desirable for the drive device to be fitted to the vehicle body from the inner side of the aperture portion.

By employing the structure, it is possible to perform the fixing work for the drive device from the inner side of the aperture portion.

In this case, the beneficial effect is obtained that it is possible to perform the fixing work for the drive device in a manner.

It is desirable for the link device to be connected to the hinge arm from the inside of the aperture portion.

By employing the structure, it is possible to fix the link device to the hinge arm from the inside of the aperture portion.

In this case, the beneficial effect is obtained that it is possible to perform the fixing work for the link device in an easy manner.

The automatic opening and closing device according to the present invention may have a constitution such as: the link device includes a first link member which is coupled to the drive device, and a second link member of which one end portion is coupled to the first link member so as to be freely rotatable and the other end portion is coupled to the hinge arm; and the opening and closing member is opened and closed in the upwards and downwards direction, and the first link member makes substantially a right angle with the second link member when a center of gravity of the opening and closing member is positioned upon the same horizontal line as the axis of rotation of the opening and closing member.

By employing the structure, it is possible to transmit the drive force in the lengthwise direction of the second link member by making a substantially right angle with the first link member when the greatest driving force is required and the drive moment is greatest in driving the opening and closing member.

In this case, the beneficial effect is obtained that it is possible to transmit the drive force to the hinge arm in a reliable manner.

DETAILED DESCRIPTION OF THE INVENTION

Next, an embodiment of the present invention will be explained with reference to the drawings.

Figure 1:
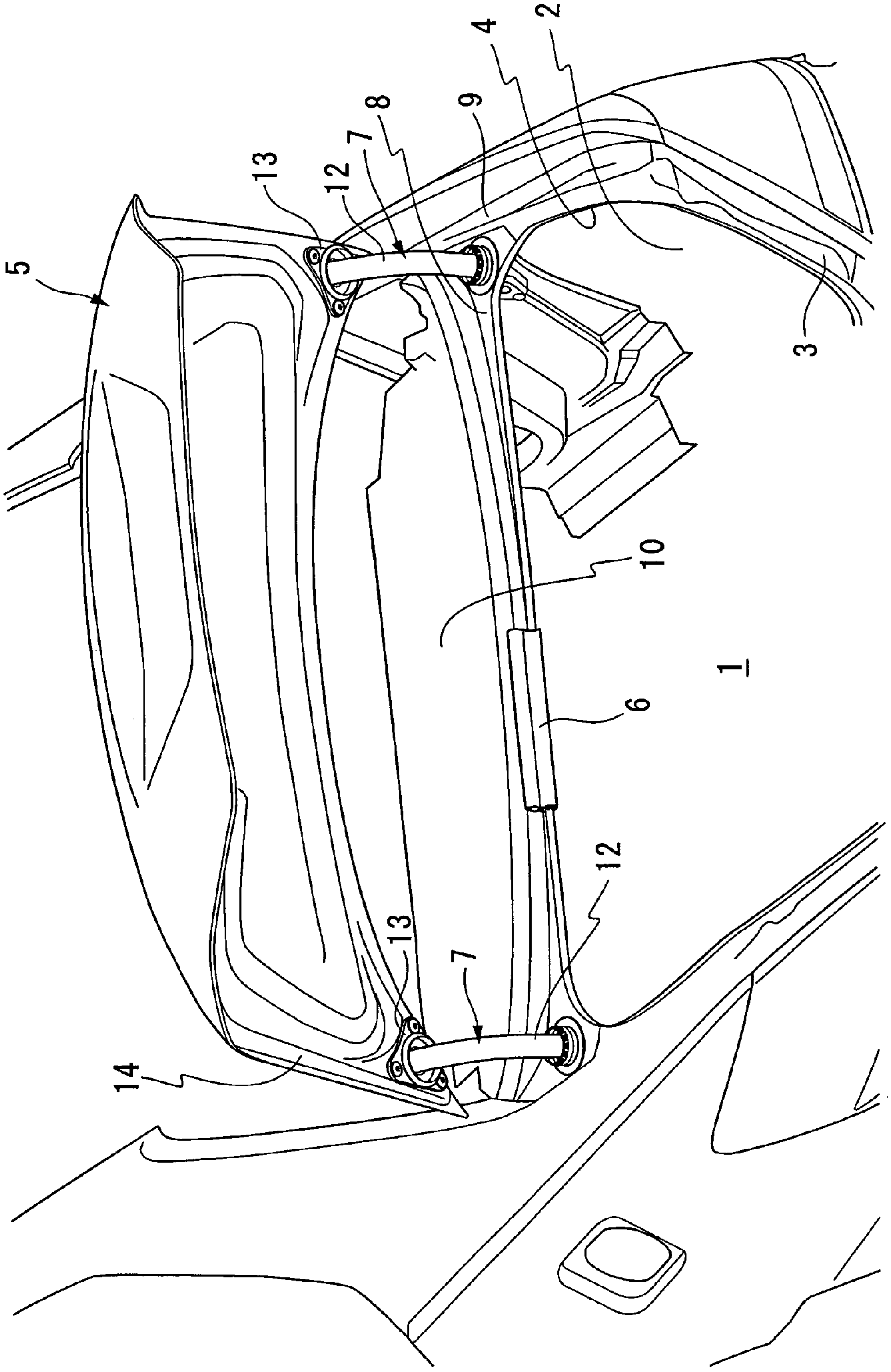
FIG. 1 is a perspective view showing the rear portion of a vehicle body according to an embodiment of the present invention.

As shown in FIG. 1, a trunk room aperture portion (i.e., aperture portion) 2 is formed at the upper portion of a trunk room 1 provided in the rear portion of a vehicle body. The trunk room aperture portion 2 is formed in a range in which a rear end panel 3 is cut away from the upper portion to the rear side portion of the trunk room 1 in a hollow shape. A trunk weather strip 6 is attached closely to the rear surface of a trunk lid (opening and closing member) 5 at an opening flange portion 4 of the trunk room aperture portion 2. The trunk lid 5 is supported in the trunk room aperture portion 2 via a hinge arm 7 so as to be capable of operating. A gutter 8 is provided around the opening flange portion 4. When the trunk lid 5 has been closed, water which has penetrated in from the joining portion between the trunk lid 5 and a vehicle body panel 9 is guided by this gutter 8 and discharged downwards. The reference symbol 10 in FIG. 1 denotes a rear parcel shelf.

Figure 2:
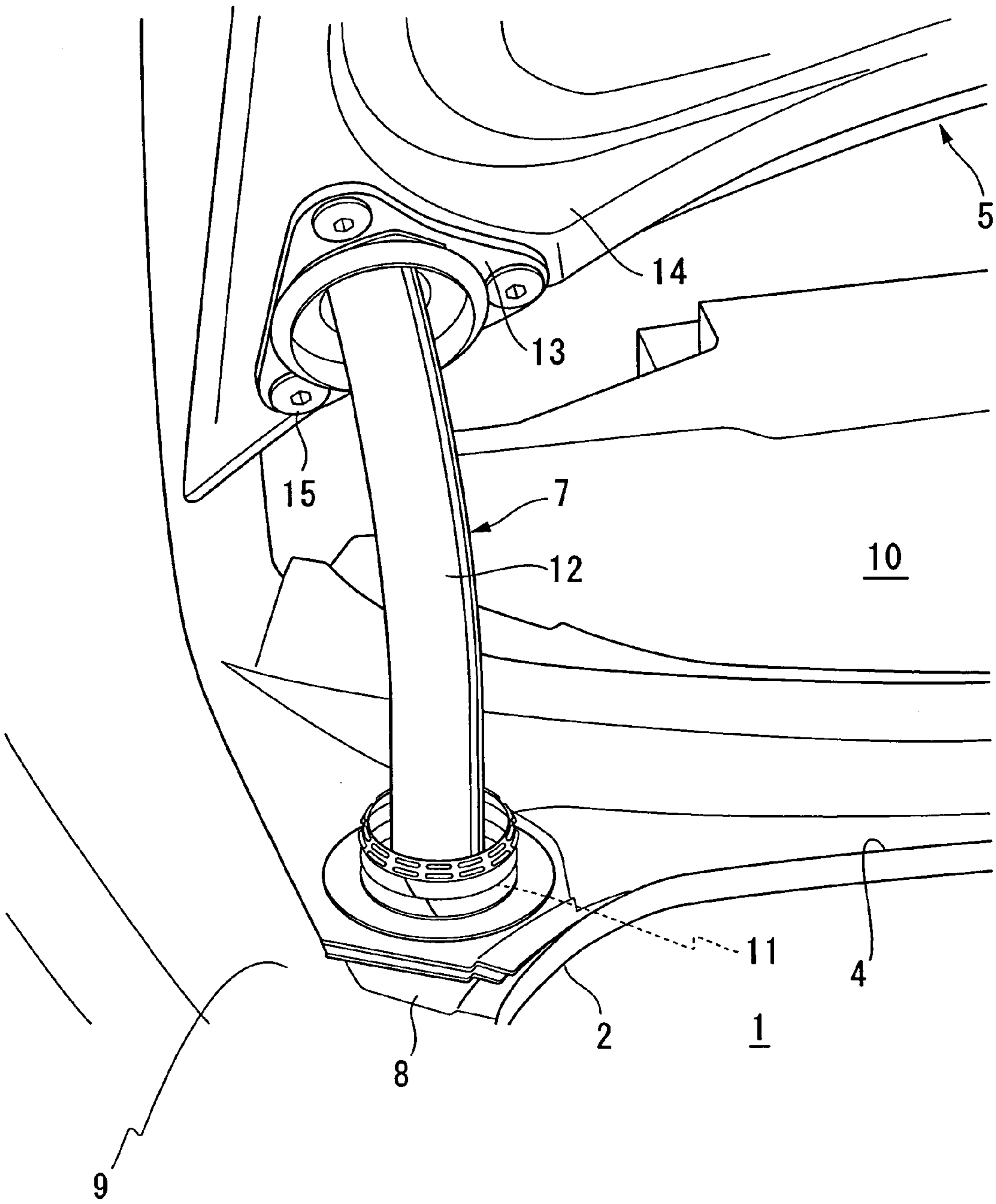
FIG. 2 is an enlarged view showing a portion of FIG. 1.
Figure 3:
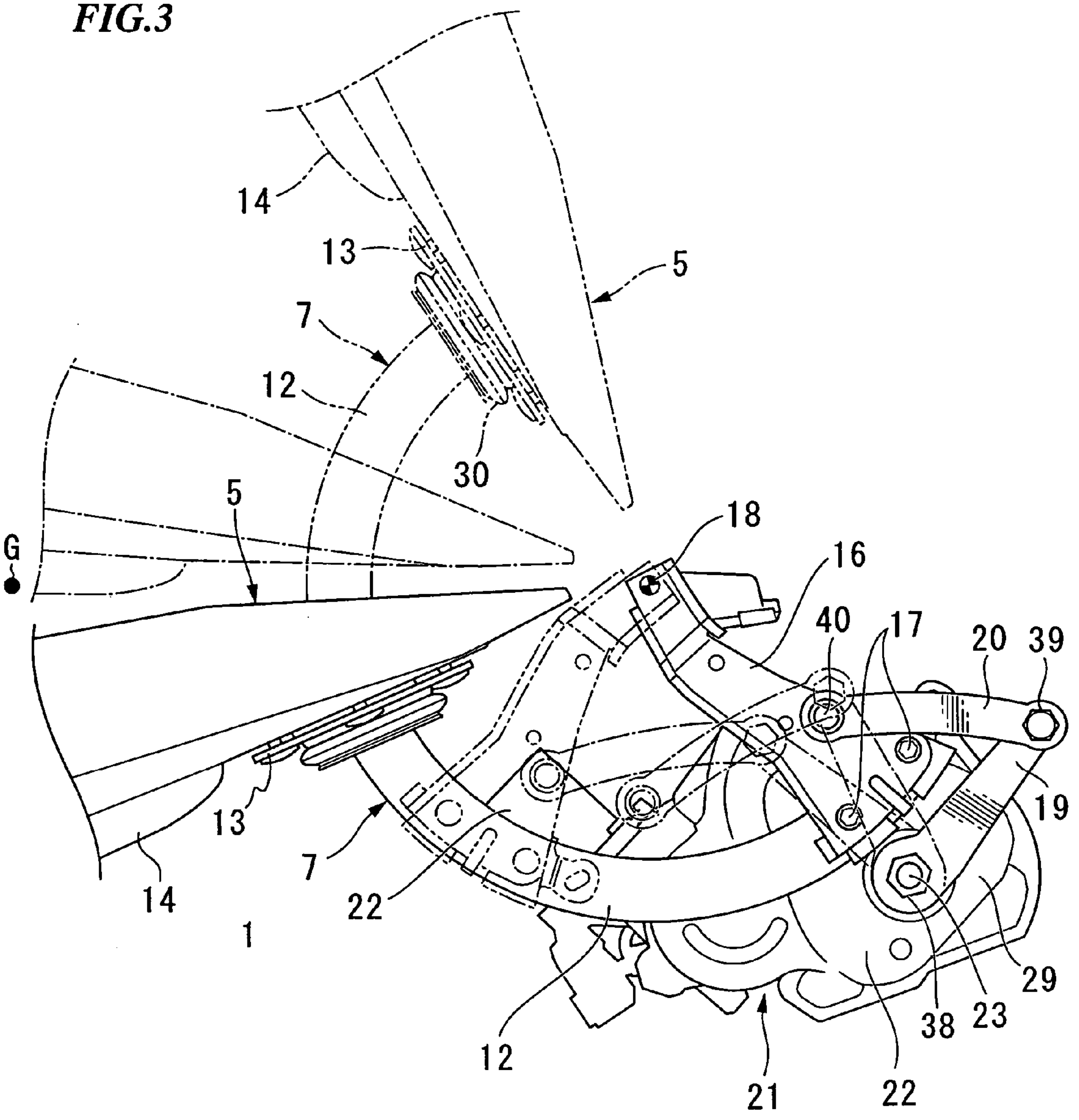
FIG. 3 is an explanatory side view showing the opened and closed states of a trunk lid.

As shown in FIGS. 2 and 3, an inserting hole 11 which pierces through into the interior of the trunk room 1 is formed in the gutter 8, corresponding to the upper corner portion of the trunk room aperture portion 2. An arm body 12 of the hinge arm 7 passes through the inserting hole 11. The upper end portion of the arm body 12 is fixed to an inner panel 14 of the trunk lid 5 via a bracket 13 by bolts 15. An arm bracket 16 is fixed via a bracket and by bolts 17 to the lower end portion of the arm body 12 so as to extend perpendicularly thereto. The arm bracket 16 is supported upon a hinge center (i.e., axis) 18 of the vehicle body so as to be able to rotate.

The arm bracket 16 is connected via a first link (i.e., link member) 19 and a second link (i.e., link member) 20 to a drive unit (drive device) 21, so that the trunk lid 5 is automatically opened and closed by electrical operation, due to the drive force which is generated by the drive unit 21.

Specifically, the first link 19 is fixed to a rotation shaft 23 of the drive unit 21 which is provided with a motor 22. The second link 20 is rotatably supported at the end of the first link 19. The end of the second link 20 is rotatably supported at substantially the central portion of the arm bracket 16. In FIG. 3, the double dotted broken lines show the fully opened position of the trunk lid 5 and the positions of the first link 19 and the second link 20.

Figure 4:
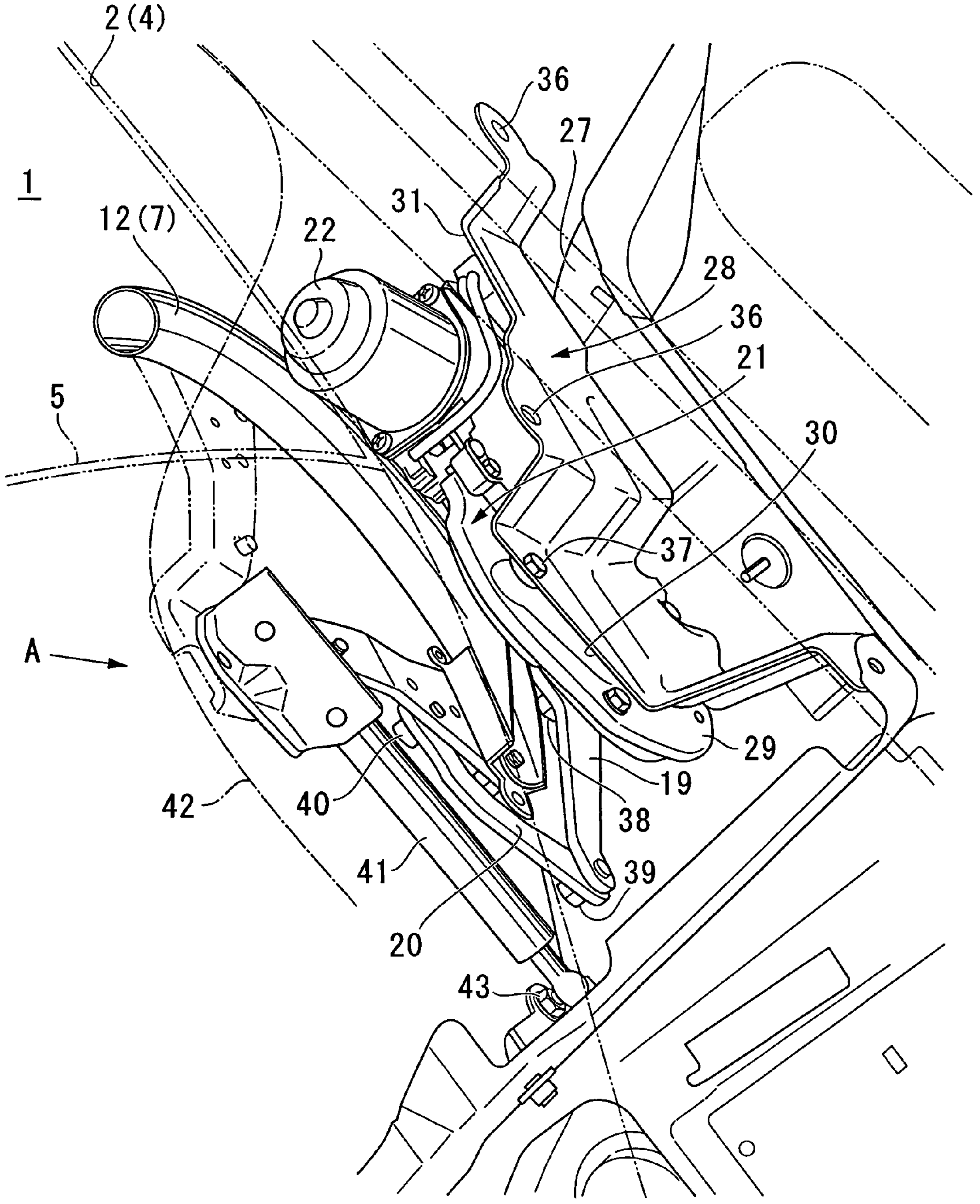
FIG. 4 is a perspective view showing a drive unit fitting portion within a trunk room viewed from slantingly from above.
Figure 5:
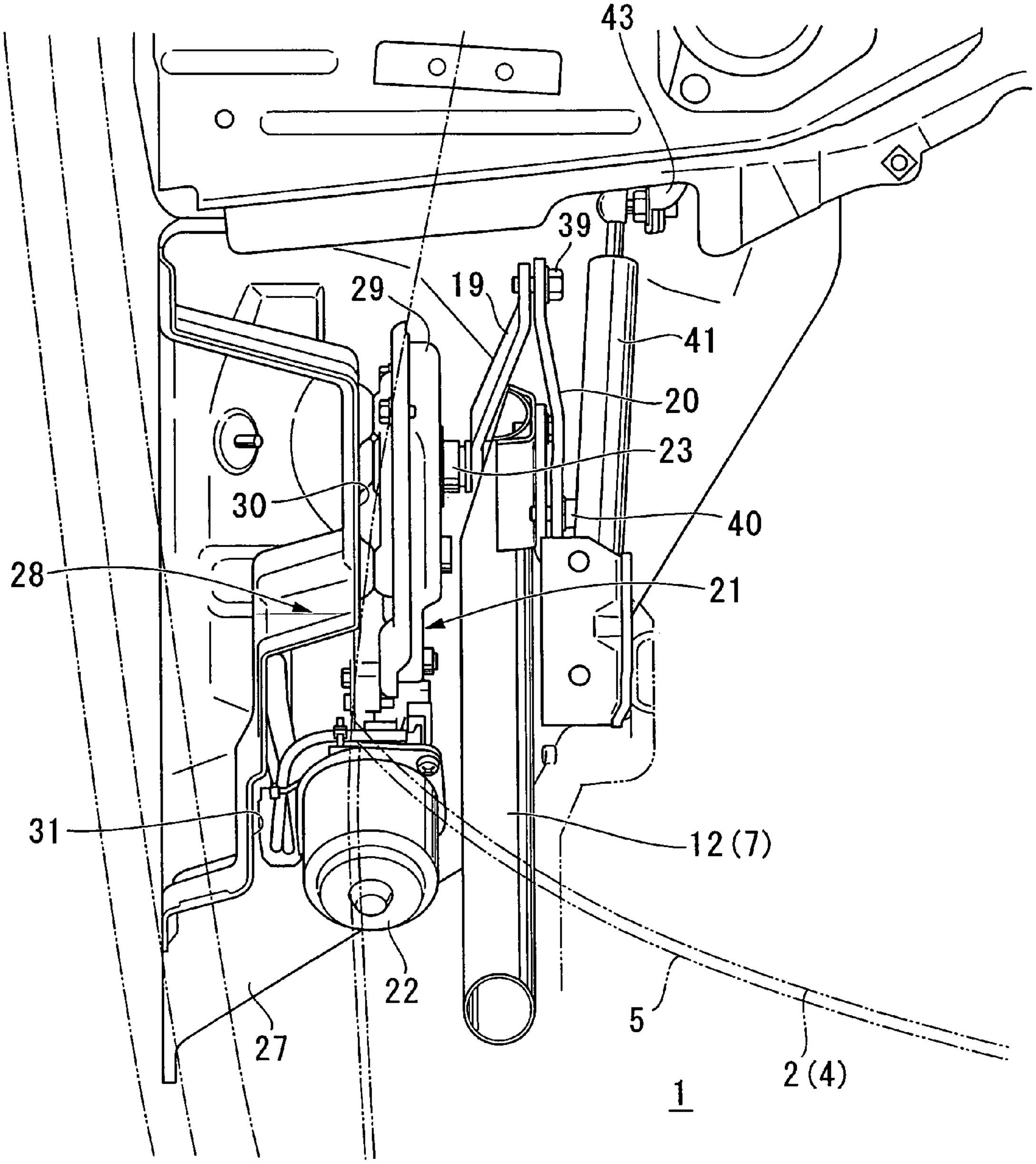
FIG. 5 is a plan view showing the drive unit fitting portion within the trunk room viewed from above.
Figure 6:
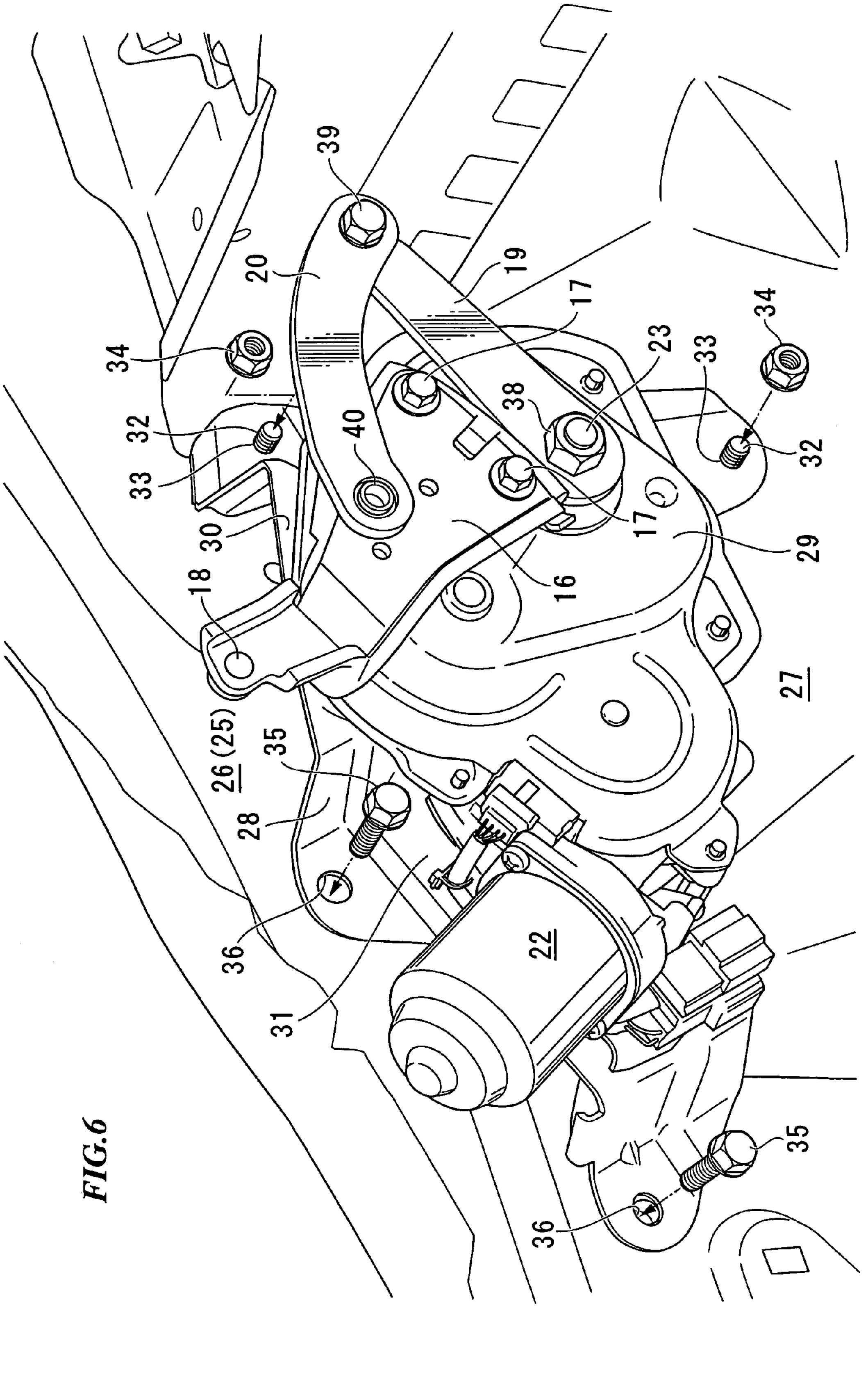
FIG. 6 is a perspective view taken along the arrow A in FIG. 4.

As shown in FIGS. 4 through 6, a bracket 28 is fitted to an inner side wall which constitutes an edge portion of the trunk room 1, i.e. to the inner panel 26 and a wheel house inner panel (i.e., vehicle body) 27 of a rear fender (i.e., vehicle body) 25. The drive unit 21 is supported upon the bracket 28. The bracket 28 is provided with a reduction device support face 30 which supports a reduction device 29 of the drive unit 21 upon its front side and a motor support face 31 which supports a motor 22. The motor support face 31 is formed lower down and towards the exterior of the vehicle body, than the reduction device support face 30.

Insertion holes 33 for stud bolts 32 which project from the inner panel 26 and from the wheel house inner panel 27 of the rear fender 25 are formed in the upper and lower portions of the front side of the bracket 28 for temporarily holding the bracket 28 (refer to FIG. 6). The bracket 28 is fitted by the stud bolts 32 with nuts 34 being fastened from the interior of the compartment, i.e., the inside of the trunk room 1. Fixing holes 36 for fitting the bracket 28 are formed in the rear portion and in the upper portion substantially in center thereof along the front and rear direction of the bracket 28 upon which bolts 35 or nuts are fixed thereto from the interior of the vehicle body, that is to say, from the interior of the trunk room 1. The drive unit 21 is fixed by bolts 37 upon the bracket 28 which has the above described structure. As shown in FIG. 4, the bracket 28, drive unit 21, arm bracket 16, first link 19, and second link 20 are covered over by a lining 42, so that they are not exposed within the trunk room 1.

The base end of the first link 19 is attached and fixed by a nut 38 from the interior of the trunk room aperture portion 2, i.e., from the interior of the trunk room 1, upon the rotation shaft 23 of the drive unit 21. The base end of the second link 20 is mounted to the end of the first link 19 by a bolt 39 from within the trunk room 1 via a bearing (not shown in), so as to rotate freely. Furthermore, the end of the second link 20 is linked from within the trunk room 1 by a ball joint 40 to the substantially central portion of the arm bracket 16, so as to rotate freely.

Here, the first link 19 and the second link 20 are provided so as to straddle the arm body 12 of the hinge arm 7. The second link 20 is formed in a shape which is curved to be projected upwards, so as not to impede the bolt 17 for fixing together the arm bracket 16 and the arm body 12 of the hinge arm 7 described above (refer to FIGS. 7 and 8). Furthermore, when the center of gravity G of the trunk lid 5 is positioned upon the same horizontal axis as the hinge center 18 of the trunk lid 5, i.e., in the present embodiment, when the trunk lid 5 is in a state of being somewhat opened from closed state (refer to the single dotted broken line in FIG. 3), the first link 19 and the second link 20 form an substantial right angle (desirably, a right angle). For the sake of convenience, the arm body 12 of the hinge arm 7 is omitted in FIG. 6.

When the center of gravity G of the trunk lid 5 is positioned upon the same horizontal axis as the hinge center 18 of the trunk lid 5, the trunk lid 5 is in a state somewhat opened from closed state. This is because the center of gravity G of the trunk lid 5 is positioned below the upper surface of the trunk lid 5, since the trunk room aperture portion 2 is formed in a range in which a rear end panel 3 is cut away from the upper portion to the rear side portion of the trunk room 1 in a hollow shape so that the trunk lid 5 of the present embodiment, the rear edge of the trunk lid 5 has a shape which extends out in the downwards direction. Accordingly, when the trunk lid 5 has been closed, the first link 19 and the second link 20 form an acute angle.

Figure 7:
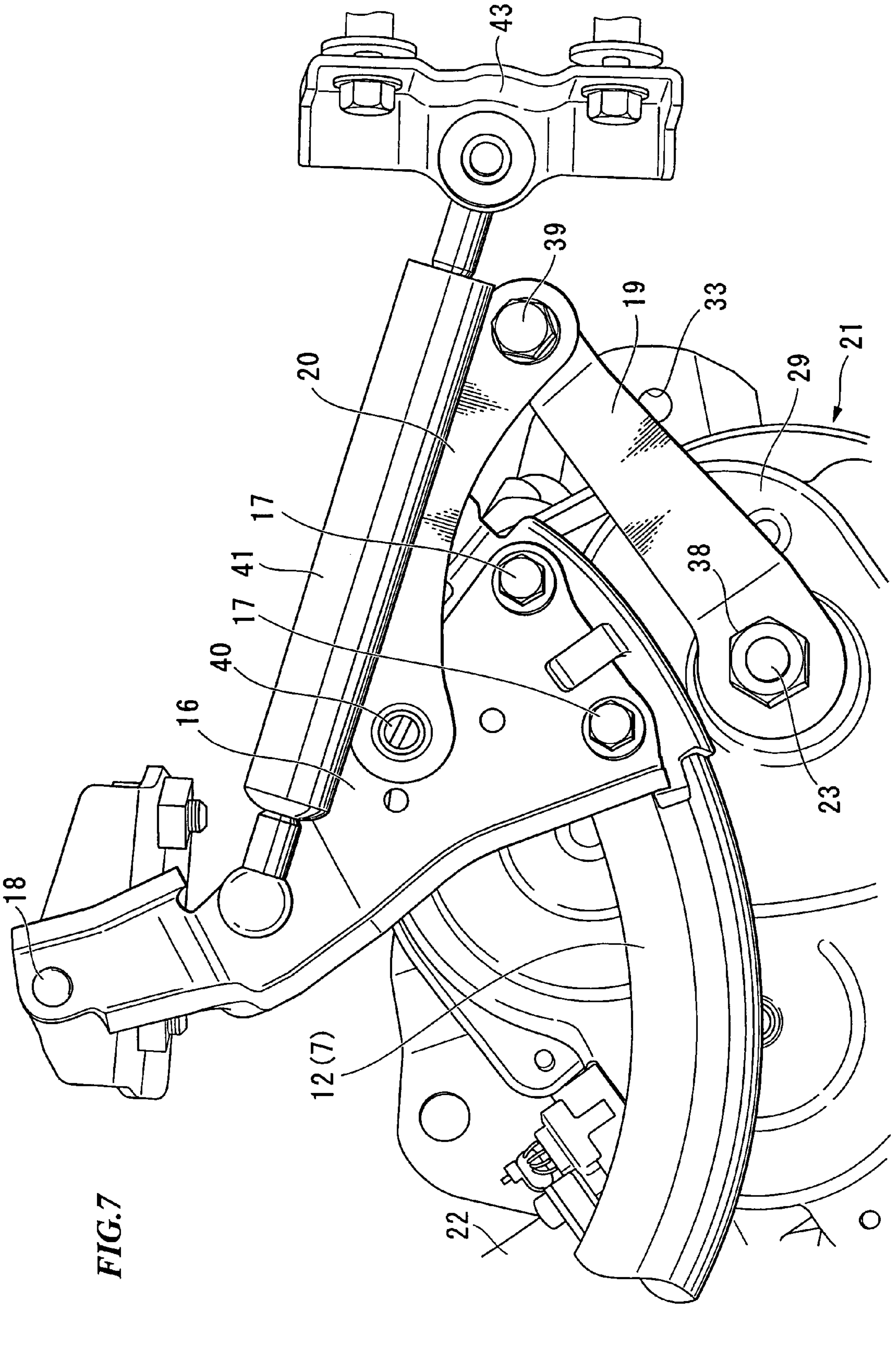
FIG. 7 is a side view showing a mounting layout of an opening stay, first link, and a second link.
Figure 8:
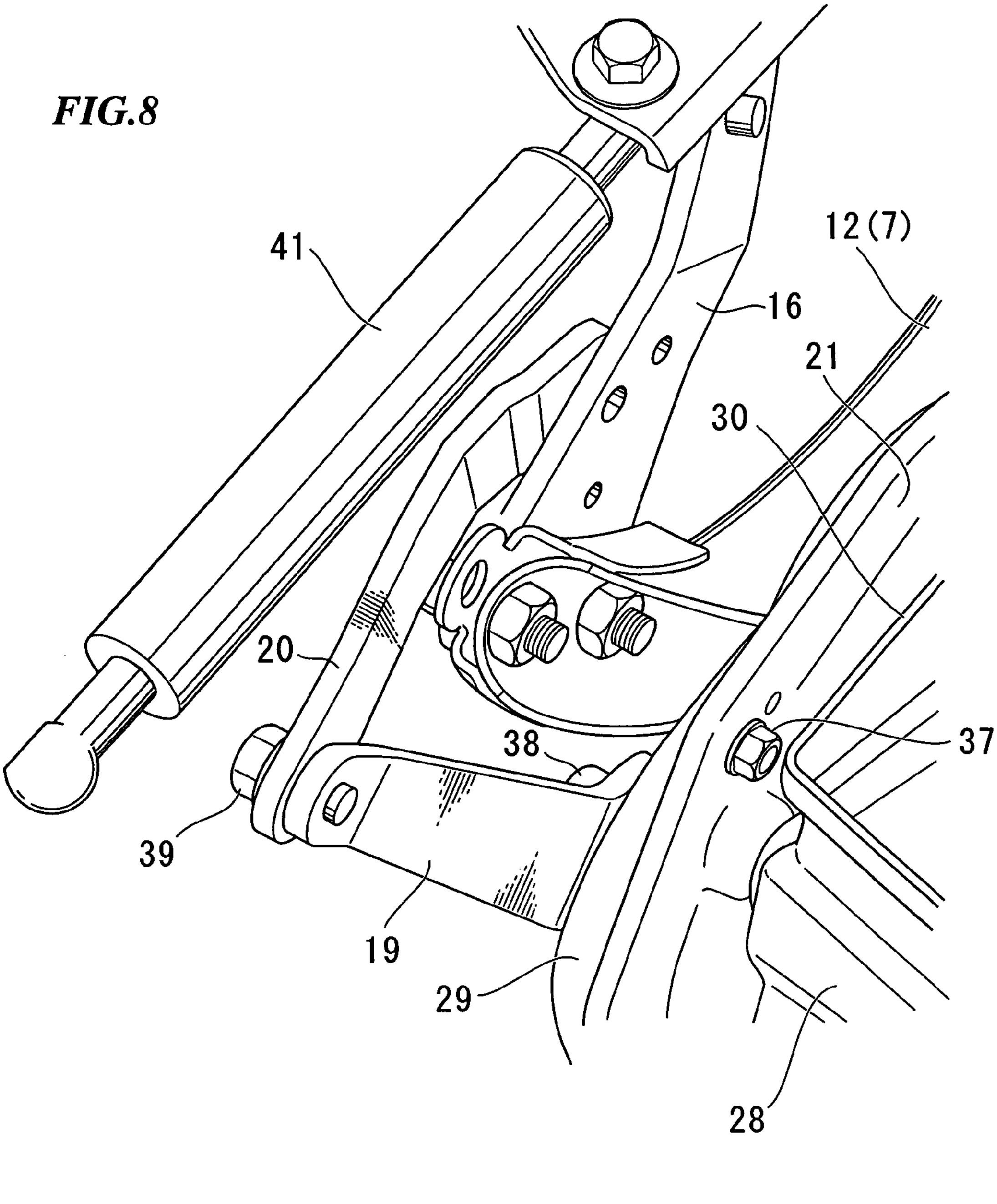
FIG. 8 is a perspective view showing the opening stay, the first link, and the second link.

A gas type open stay 41 is fitted between the vicinity of the hinge center 18 of the arm bracket 16 and the front edge of the trunk room aperture portion 2. The open stay 41 assists the opening action of the trunk lid 5 by the drive unit 21, by being shortened when the trunk lid 5 is closed and being expanded when the trunk lid 5 is opened. Specifically, the end (the inner end) of the open stay 41 is supported upon the front edge of the trunk room aperture portion 2 via a bracket 43 as shown in FIG. 7 so as to be rotatable along the vertical directions. The main portion (the outer side) of the open stay 41 is rotatably supported upon the arm bracket 16, although not shown.

According to the embodiment, the drive unit 21 is fixed to the inner panel 26 and the wheel house inner panel 27 of the rear fender 25 via the bracket 28, accordingly it is possible to enhance the operating reliability for the trunk lid 5 by stabilizing the operation of the drive unit 21. Furthermore, since during the operation of the trunk lid 5 the drive unit 21 does not change the attitude thereof, the drive device is not required changing the attitude thereof so that the drive force is smaller than in the case in which the drive unit 21 varies attitude thereof. Accordingly it is possible to make a contribution to the enhancement of fuel economy, since it is possible to anticipate a lightening of the vehicle body as a whole by making the drive unit 21 more compact.

Since the drive unit 21 is provided at the edge portion of the trunk room aperture portion 2, and the first link 19 and the second link 20 are provided so as to straddle the arm body 12 of the hinge arm 7, accordingly it is possible to keep the trunk room aperture portion 2 as large as possible and increase the load carrying capacity.

When fitting the drive unit 21, the work for fitting the drive unit 21 may be performed easily, since, before fitting the lining 42, the drive unit 21 is fixed from the inside of the trunk room aperture portion 2, via the bracket 28, to the inner panel 26 and the wheel house inner panel 27 of the rear fender 25, which is the vehicle body.

When fitting the first link 19 and the second link 20 to the arm bracket 16, to the fitting work may be performed from the inside of the trunk room 1, accordingly it is possible to perform the fitting work for the first link 19 and the second link 20 easily.

The first link 19 and the second link 20 make substantially a right angle at the connected point with respect to one another when the center of gravity G of the trunk lid 5 is positioned upon the same horizontal line as the hinge center 18 of the trunk lid 5, i.e., in the embodiment, when the trunk lid 5 is in a state of being somewhat opened from its closed state (refer to the single dotted broken line in FIG. 3). Accordingly, when the drive moment is at a maximum and requires the most drive force for the operation of opening the trunk lid 5, it is possible to ensure that the first link 19 and the second link 20 are substantially at right angles to one another, so that the drive force is transmitted in the longitudinal direction of the second link 20.

Accordingly, the drive force may be reliably transmitted to the hinge arm 7. That is to say, the moment which acts upon the first link 19 from the rotation shaft 23 of the drive unit 21 becomes maximum when, as described above, the center of gravity G of the trunk lid 5 is positioned upon the same horizontal line as the hinge center 18 of the trunk lid 5. At this time the second link 20 which is roughly orthogonal to the first link 19 may receive this moment in the longitudinal direction thereof, which is advantageous in strength. Accordingly the second link 20 may more reliably receive the moment than receiving the moment in an angled direction.

It should be understood that the present invention is not to be considered as being limited by the details of the embodiment described above; for example, the opening and closing member is not limited to being a trunk lid, and it would be possible to apply to an engine hood or a side door or the like.

The prevent invention is not limited to the embodiment. Additions, omissions, substitutions, and other modifications may be made without departing from the scope of the present invention. The present invention is not to be considered as being limited by the foregoing description, and is only limited by the scope of the appended claims.

What is claimed is:

1. An automatic opening and closing device comprising:
an opening and closing member;
a drive device which generates drive force for operating the opening and closing member;
a hinge arm which is mounted between a vehicle body and the opening and closing member; and
a link device which transmits the drive force of the drive device to the opening and closing member;
wherein the drive device is fitted to an edge portion of an aperture portion for the opening and closing member which is formed in the vehicle body, and
wherein the link device is provided so as to straddle the hinge arm.

2. An automatic opening and closing device according to claim 1, wherein the drive device is fitted to the vehicle body from an inner side of the aperture portion.

3. An automatic opening and closing device according to claim 1, wherein the link device is connected to the hinge arm from an inside of the aperture portion.

4. An automatic opening and closing device according to claim 1,
wherein the link device comprises a first link member which is coupled to the drive device, and a second link member of which one end portion is coupled to the first link member so as to be freely rotatable and the other end portion is coupled to the hinge arm,
wherein the opening and closing member is opened and closed in the upwards and downwards direction, and
wherein the first link member substantially defines a right angle with the second link member, when a center of gravity of the opening and closing member is positioned upon the same horizontal line as an axis of rotation of the opening and closing member.

* * * * *